Jan. 19, 1960

W. E. TOLLES 2,921,739

PRODUCT-TAKING SYSTEM

Original Filed Aug. 25, 1944

Inventor
WALTER E. TOLLES

By R. I. Tompkins

Attorney

United States Patent Office 2,921,739
Patented Jan. 19, 1960

2,921,739
PRODUCT-TAKING SYSTEM

Walter E. Tolles, Hicksville, N.Y., assignor to the United States of America as represented by the Secretary of the Navy Original application August 25, 1944, Serial No. 551,238, now Patent No. 2,700,135, dated January 18, 1955. Divided and this application July 31, 1953, Serial No. 371,619

2 Claims. (Cl. 235—194)

This is a division of my copending application Serial No. 551,238, filed August 25, 1944, now Patent Number 2,700,135, issued on January 18, 1955.

This invention relates to product-taking systems, and more particularly to systems for producing an output voltage proportional to the product of a number of varying input voltages.

In many measuring and computing instruments, it is necessary to determine the product of two or more measured quantities or to find the square or some other power of a single quantity. Such requirements are often found in systems which are of a predominantly electrical nature where a voltage proportional to the product of two or more input voltages or to the square or higher power of a single input voltage is to be obtained. Since systems of this general type are usually relatively complex, it is desirable that the squaring or product-taking circuits be made as simple as possible.

Accordingly, there is proposed a product-taking system comprising ring modulators for successively modulating a constant-frequency carrier with the varying input voltages to be multiplied, these voltages being either direct-current voltages or alternating-current voltages of relatively low frequency, and means for demodulating the output of the last of the modulating means to separate the carrier from the desired product voltage.

For a better understanding of the invention, reference is made to the accompanying drawing, in which.

Figure 1:
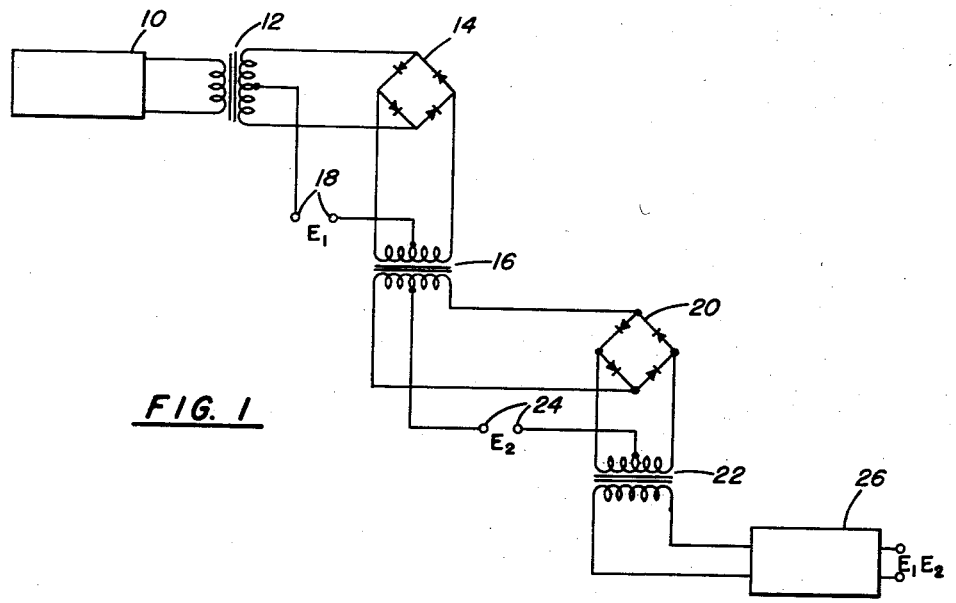
Fig. 1 shows a product-taking system in accordance with the invention.

Referring to Fig. 1, the product-taking system includes an oscillator 10 arranged to produce a carrier voltage $A \sin \omega t$ of substantially constant frequency. This oscillator may be of any suitable type, and the carrier frequency is preferably high enough so that the voltages to be multiplied do not introduce appreciable frequency distortion in the carrier. The output of oscillator 10 is applied through an input transformer 12, having a tapped secondary winding, to one diagonal of a conventional copper-oxide ring modulator 14. Output transformer 16, having tapped primary and secondary windings, is connected across the other diagonal of the ring modulator. The varying modulating voltage, designated $E_1$, is applied to the ring modulator through terminals 18, connected between the tap of the secondary winding of input transformer 12 and the tap of the primary winding of output transformer 16.

A consideration of the circuit connections just described will indicate that the output voltage appearing across the secondary winding of transformer 16 is proportional to $E_1 A \sin \omega t$. This voltage is applied to the input diagonal of a second ring modulator 20, and an output transformer 22, having a tapped primary winding, is connected across the other diagonal of this ring modulator. A second varying input voltage is applied to ring modulator 20 through terminals 24, connected between the tap of the secondary winding of transformer 16 and the tap of the primary winding of transformer 22. The voltage appearing across the secondary winding of transformer 22 is then proportional to $E_1 E_2 A \sin \omega t$.

It will be understood that additional stages of ring modulators and associated circuits may be added to provide means for obtaining output voltages proportional to the product of more than two input voltages, the circuit arrangements being exactly similar to those described above. It may be necessary, in some cases, to provide buffer-amplifier stages between successive ring modulators to maintain the carrier amplitude within the efficient operating range of the ring modulators.

The output of the last of the ring modulators, in this case that of ring modulator 20, is demodulated by demodulator 26 to separate the product voltage from the carrier. While demodulator 26 may be of any suitable type, it may conveniently be a ring demodulator arranged to suppress the carrier and produce an output voltage proportional only to the product of the varying input voltages, this product in the present example being $E_1 E_2$.

Figure 2:
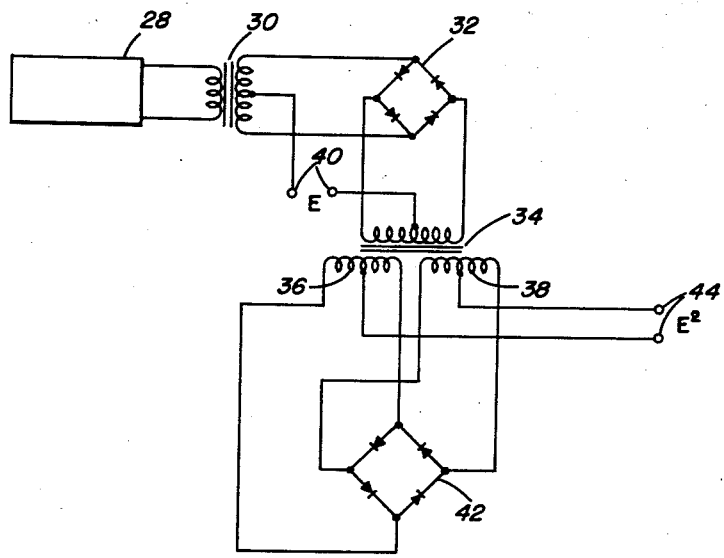
Fig. 2 shows a modification of the system of Fig. 1 which may be used to provide an output voltage proportional to the square of an input voltage.

It will be recognized that the system just described may be used equally well to obtain output voltages proportional to the square of a single input voltage or, through the use of additional stages, to higher powers of the input voltage. In this particular application, however, the system may be simplified with further savings in equipment. Such a simplified system is shown in Fig. 2 of the drawing.

In this system, oscillator 28, of the same general type as oscillator 10, is arranged to produce a constant-frequency carrier, $A \sin \omega t$. The output of this oscillator is applied through transformer 30, having a tapped secondary winding, to one diagonal of a ring modulator 32 across the other diagonal of which is connected an output transformer 34, provided with a tapped primary winding and two tapped secondary windings 36 and 38. The input voltage to be squared is applied through terminals 40, connected between the tap of the secondary winding of transformer 30 and the tap of the primary winding of transformer 34. The output of this circuit arrangement, which appears across each of secondary windings 36 and 38 of transformer 34, is proportional to $EA \sin \omega t$.

Secondary windings 36 and 38 are connected across the two diagonals of ring demodulator 42, respectively, the output of this demodulator appearing between the taps of secondary windings 36 and 38, which are connected to output terminals 44. Ring modulator 42 acts as a diode ring multiplier. An output voltage is therefore produced across output terminals 44 that is proportional to the product of the input voltages applied to ring modulator 42 from secondary windings 36, 38, or expressed mathematically, an output voltage is produced that is proportional to $(EA \sin \omega t)^2$, which may be expressed as $$\frac{E^2 A^2}{2}(1 - \cos 2\omega t) \text{ or } \frac{E^2 A^2}{2} - \frac{E^2 A^2}{2}(\cos 2\omega t)$$

The output voltage appearing at terminals 44 is thus proportional to the square of the input voltage, E, as desired, and comprises a D.C. component plus a sinusoidally varying component proportional to the second harmonic of the carrier voltage (the carrier itself being suppressed in a manner characteristic of ring modulators). In some applications, it may be desirable to eliminate either the D.C. component or the sinusoidally varying component of the output voltage. Conventional means for eliminating either component if desired will occur to those skilled in the art, for example, either component may be eliminated by the use of conventional filters (not shown).

I claim:
1. A system for producing an output voltage which is the square of an input voltage, comprising: a ring modulator; a first transformer having a center-tapped secondary connected across one diagonal of said ring modulator; means applying a carrier voltage to the primary winding of said first transformer, a second transformer having a center-tapped primary winding and two center-tapped secondary windings, said primary windings being connected across the other diagonal of said ring modulator; means applying said input voltage across the center tap of the secondary of said first transformer and the center tap of the primary of said second transformer; a second ring modulator; one of said two secondary windings being connected across one diagonal of said second ring modulator, and the other of said two secondary windings being connected across the other diagonal of said second ring modulator; the said output being taken from across the center taps of the said two secondary windings.

2. A system for producing an output voltage which is the square of an input voltage, comprising: a first ring modulator having two inputs and transformer output means, means for impressing an input voltage to be squared on one input and a constant frequency carrier on the other input, a second ring modulator having two transformer secondary means as inputs and an output, means for impressing the output of the first ring modulator on each of the two transformer secondary inputs of the second ring modulator whereby the square of the input voltage appears on the output of the second ring modulator.

References Cited in the file of this patent
UNITED STATES PATENTS

| | | |
|---|---|---|
| 2,025,158 | Cowan | Dec. 24, 1935 |
| 2,166,991 | Guanella | July 25, 1939 |
| 2,362,898 | Gilman | Nov. 14, 1944 |
| 2,410,651 | Glass | Nov. 5, 1946 |
| 2,476,747 | Lovell | July 19, 1949 |

OTHER REFERENCES

Ser. No. 374,956, F. L. Stumpers et al. (A.P.C.), published May 18, 1943.